United States Patent
Saisho et al.

(10) Patent No.: US 9,158,124 B2
(45) Date of Patent: Oct. 13, 2015

(54) IMAGE DISPLAY DEVICE AND VEHICLE INCORPORATING THE SAME

(71) Applicants: Kenichiroh Saisho, Setagaya-ku (JP); Makoto Inamoto, Kawasaki (JP); Yasuhiro Satoh, Yokohama (JP); Jun Watanabe, Atsugi (JP)

(72) Inventors: Kenichiroh Saisho, Setagaya-ku (JP); Makoto Inamoto, Kawasaki (JP); Yasuhiro Satoh, Yokohama (JP); Jun Watanabe, Atsugi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/094,978

(22) Filed: Dec. 3, 2013

(65) Prior Publication Data
US 2014/0177022 A1 Jun. 26, 2014

(30) Foreign Application Priority Data

| Dec. 21, 2012 | (JP) | 2012-279732 |
| Dec. 21, 2012 | (JP) | 2012-279733 |
| Oct. 31, 2013 | (JP) | 2013-226837 |
| Oct. 31, 2013 | (JP) | 2013-226840 |

(51) Int. Cl.
| G02B 26/08 | (2006.01) |
| G02B 26/10 | (2006.01) |
| G02B 26/12 | (2006.01) |
| G02B 27/48 | (2006.01) |
| G02B 27/01 | (2006.01) |
| G02B 3/00  | (2006.01) |

(52) U.S. Cl.
CPC .............. *G02B 27/48* (2013.01); *G02B 3/0006* (2013.01); *G02B 3/0056* (2013.01); *G02B 26/101* (2013.01); *G02B 27/0101* (2013.01)

(58) Field of Classification Search
CPC .. G02B 26/105; G02B 26/10; G02B 21/0032; G02B 21/365; G02B 3/005; G02B 3/0062; G02B 27/0961; G02B 27/0966; G02B 5/201
USPC ................................ 359/454–458, 619–633
See application file for complete search history.

(56) References Cited

U.S. PATENT DOCUMENTS

| 5,719,706 A | 2/1998 | Masumoto et al. |
| 2003/0002022 A1 | 1/2003 | Schultz |
| 2003/0076607 A1 | 4/2003 | Antoni et al. |
| 2005/0083503 A1 | 4/2005 | Antoni et al. |
| 2005/0121601 A1 | 6/2005 | Ohmuro |
| 2007/0041077 A1 | 2/2007 | Seo et al. |
| 2007/0070507 A1 | 3/2007 | Yee et al. |
| 2009/0135374 A1 | 5/2009 | Horiuchi et al. |
| 2009/0194666 A1 | 8/2009 | Takamoto |
| 2012/0188652 A1 | 7/2012 | Kang et al. |

FOREIGN PATENT DOCUMENTS

| JP | 8-313847 | 11/1996 |
| JP | 2003-506881 | 2/2003 |
| JP | 2005-167824 | 6/2005 |
| JP | 4200223 | 10/2008 |
| JP | 2009-128659 | 6/2009 |
| JP | 2009-132010 | 6/2009 |
| JP | 2010-145745 | 7/2010 |
| JP | 2010-145922 | 7/2010 |
| JP | 2013-041182 | 2/2013 |

OTHER PUBLICATIONS

Extended Search Report issued Mar. 25, 2014 in European Application No. 13196285.4.

*Primary Examiner* — Mahidere Sahle
(74) *Attorney, Agent, or Firm* — Oblon, McClelland, Maier & Neustadt, L.L.P.

(57) ABSTRACT

An image display device includes a lens array, and a scanner to two-dimensionally scan the lens array with a light beam for image display, in which each of lenses of the lens array includes a convex surface with different curvatures in two directions orthogonal to the optical axis of the lens and to each other.

5 Claims, 9 Drawing Sheets

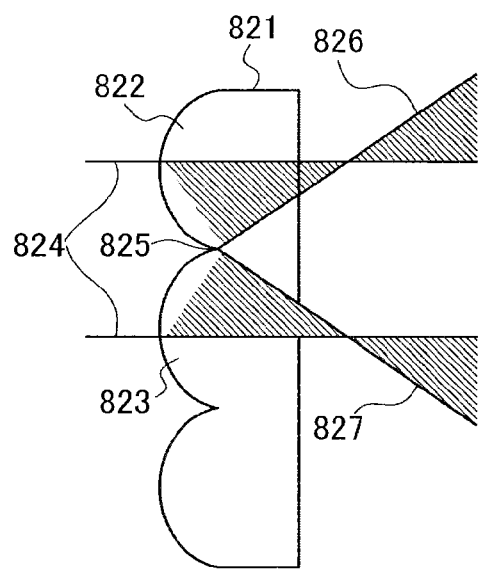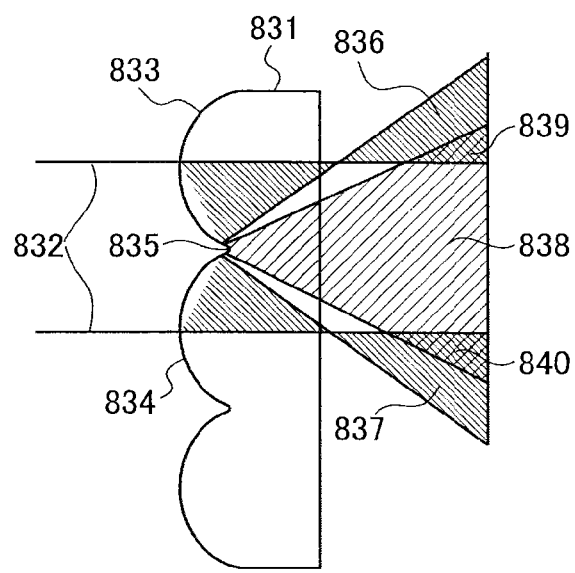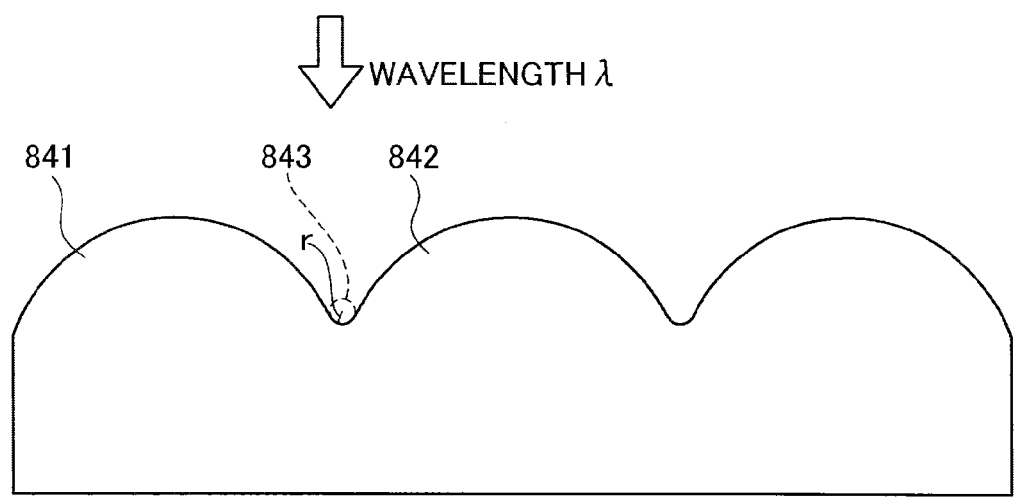

IMAGE DISPLAY DEVICE AND VEHICLE INCORPORATING THE SAME

CROSS REFERENCE TO RELATED APPLICATION

The present application is based on and claims priority from Japanese Patent Application No. 2012-279732 and No. 2012-279733, both filed on Dec. 21, 2012 and No. 2013-226837 and No. 2013-226840, both filed on Oct. 31, 2013.

BACKGROUND OF THE INVENTION

1. Field of the Invention

The present invention relates to an image display device and a vehicle comprising the image display device.

The image display device can be incorporated as a headup display device in various kinds of an operable vehicle such as automobile, train, ship and vessel, helicopter, airplane.

2. Description of the Related Art

Japanese Patent Application Publication No. 2009-128659 (Reference 1) and No. 2010-145745 (Reference 2) disclose a headup display device as an image display device which two-dimensionally scans a light beam to display an image.

This device includes a deflector to two-dimensionally deflect a light beam modulated in intensity by an image signal and scans a micro lens array with the deflected light beam to form an image thereon. The image is enlarged by a virtual image optical system and formed as an enlarged virtual image.

A reflective element is provided prior to the position of the enlarged virtual image to reflect the image to an observation side for observation.

A laser beam with high optical energy density and directivity is suitable for the light beam forming the image, as described in References 1 and 2.

However, due to the coherence of a laser beam, interfering noise such as speckle is likely to occur in an observed image. Interference fringes are a typical example of interfering noise. Interference fringes bring about degradation of image quality and visibility.

Reference 1 discloses an interfering noise removing method. Therein, micro convex cylindrical lenses are arranged as a micro lens array and the beam diameter of a scanning coherent light beam is set to a smaller value than a pitch with which the micro lenses are arranged. Then, a light source is configured to emit a light beam in pulse in synchronization with scanning so that the light beam is irradiated not astride border portions of neighboring micro lenses but only on the micro lenses.

Alternatively, an optical shield layer can be provided on the border portions in order to block the light beam from irradiating the border portions.

Interfering noise can be effectively removed in the above manners. However, to emit the light beam in pulse in synchronization with scanning and illuminate only the micro lenses, a light source and a portion scanning the light beam need to have a complex structure.

Further, with the shield layer formed at the border, a light beam can be continuously scanned, however, the light blocking by the shield layer may result in a decrease in the brightness of a displayed enlarged virtual image.

SUMMARY OF THE INVENTION

An object of the present invention is to provide an image display device which can effectively reduce visible interfering noise while maintaining the brightness of an enlarged virtual image displayed by two-dimensional scanning with a coherent light beam.

According to one embodiment, an image display device comprises a lens array, and a scanner to two-dimensionally scan the lens array with a light beam for image display, wherein each of lenses of the lens array includes a convex surface with different curvatures in two directions orthogonal to an optical axis of the lens and to each other.

BRIEF DESCRIPTION OF THE DRAWINGS

Features, embodiments, and advantages of the present invention will become apparent from the following detailed description with reference to the accompanying drawings:

FIGS. 3A to 3C show how to remove interfering noise;

DETAILED DESCRIPTION OF THE PREFERRED EMBODIMENT

Hereinafter, an embodiment of an image display device will be described in detail with reference to the accompanying drawings. Wherever possible, the same reference numbers will be used throughout the drawings to refer to the same or like parts.

Figure 1A:
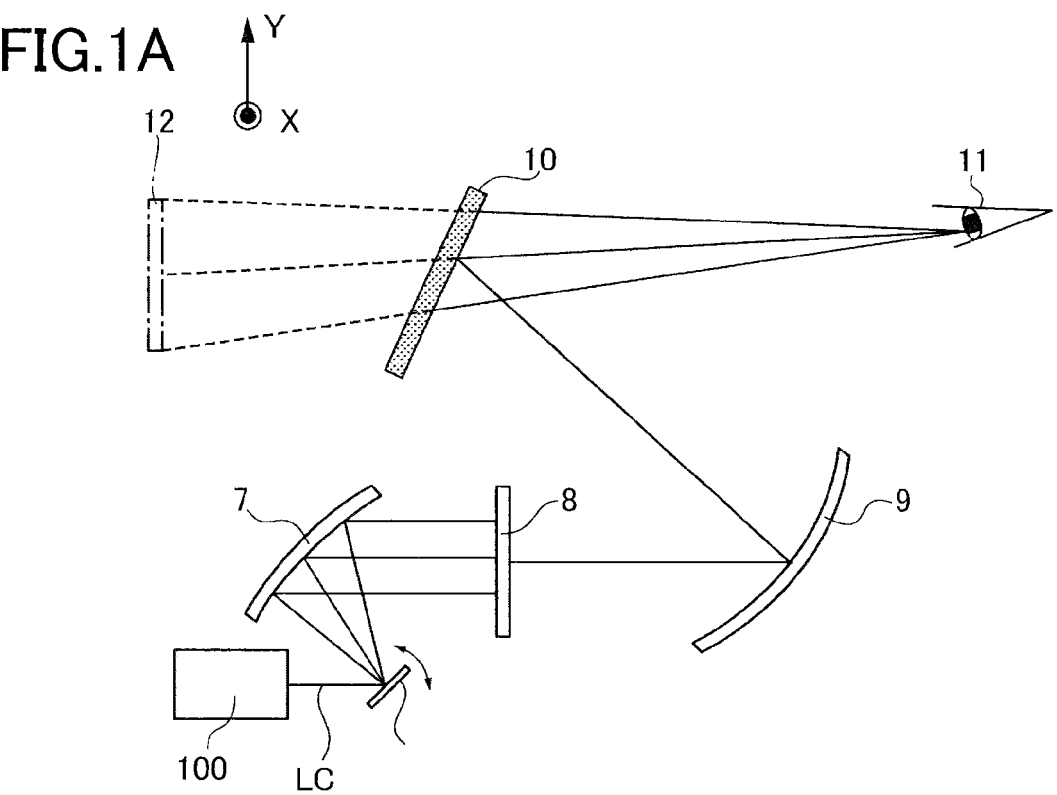
FIGS. 1A to 1C show an image display device according to one embodiment of the present invention.
Figure 1B:
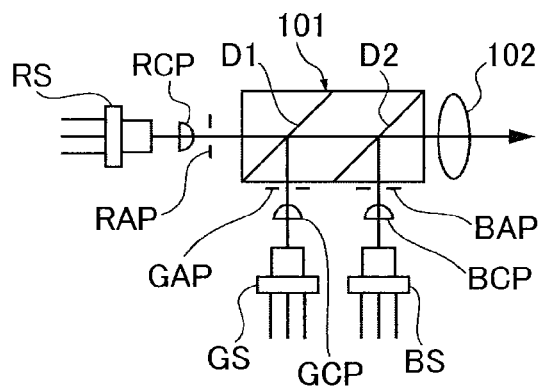
Figure 1C:
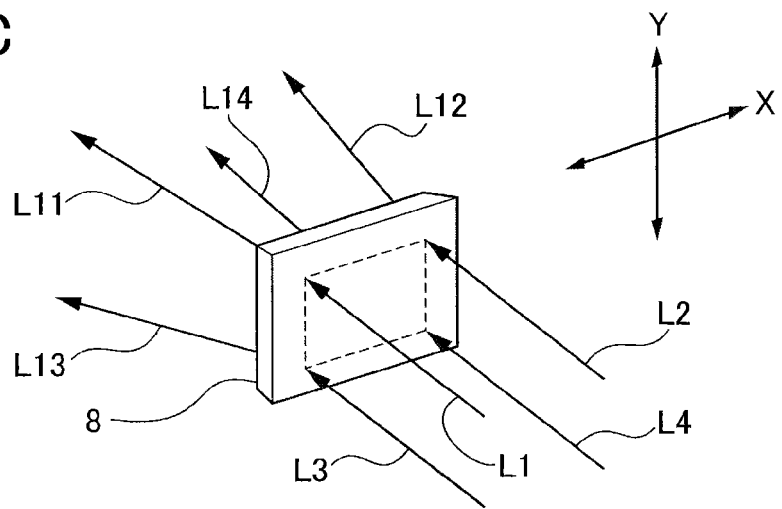

FIGS. 1A to 1C show one example of an image display device according to the present embodiment.

The image display device is a headup display device to display two-dimensional color images. FIG. 1A shows the overall structure of the device.

In FIG. 1A the image display device comprises a light source 100, an optical deflector 6, concave mirrors 7, 9, a micro lens array 8, and a reflective element 10.

The light source 100 projects a light beam LC for color image display. The light beam LC is a light beam formed by combining red (R), green (G), and blue (B) color beams into one.

The structure of the light source 100 is shown in FIG. 1B by way of example. The light source 100 includes semiconductor lasers RS, GS, BS to emit RGB laser beams, respectively, coupling lenses RCP, GCP, BCP to reduce the divergence of the three-color laser beams from the semiconductor lasers RS, GS, BS, apertures RAP, GAP, BAP to limit the beam diameters of the color laser beams, a beam synthesizing prism 101, and a lens 102.

The color laser beams of the adjusted beam diameter are incident on the beam synthesizing prism 101 which includes a dichroic film D1 to transmit red light therethrough and reflect green light, and a dichroic film D2 to transmit the red and green light therethrough and reflect blue light. Thereby, the beam synthesizing prism 101 combines red, green, and blue laser beams into a single laser beam for projection.

The single laser beam is then converted to a parallel laser beam with a certain diameter by the lens 102. The parallel laser beam is the light beam LC for image display.

The RGB laser beams constituting the light beam LC are modulated in intensity by an image signal of a color image to be displayed. That is, the semiconductor lasers RS, GS, BS are modulated in emission intensity by a not-shown driver in accordance with the respective image signals of RGB components.

The light beam LC from the light source 100 is incident on the optical deflector 6 and two-dimensionally deflected thereby. According to the present embodiment the optical deflector 6 is comprised of a micro mirror to oscillate around two mutually perpendicular axes.

Specifically, the optical deflector 6 is a MEMS (Micro Electro Mechanical System) mirror manufactured by a semiconductor process or the like.

Alternatively, the optical deflector 6 can be configured of two micro mirrors each oscillating around an axis, to oscillate in two mutually perpendicular directions.

The deflected light beam LC is incident on the concave mirror 7 and reflected to the micro lens array 8.

The concave mirror 7 functions to reflect the incident light beam LC in a constant direction. Thus, the light beam LC from the concave mirror 7 travels in parallel along with the deflection of the optical deflector 6 to the micro lens array 8 and two-dimensionally scans the micro lens array 8.

A color image having a long side and a short side is formed on the micro lens array 8 by the scanning. Needless to say that only the pixel illuminated with the light beam LC at each instant is displayed at the instant.

The color image is formed as an aggregate of pixels displayed at each instant by the scanning with the light beam LC. The light forming the color image on the micro lens array 8 is incident on and reflected by the concave mirror 9.

Although not shown in FIGS. 1A to 1C, the micro lens array 8 has a later-described micro convex lens structure. The concave mirror 9 constitutes a virtual image optical system.

The virtual image optical system forms an enlarged virtual image 12 of the color image. The reflective element 10 is provided prior to the position of the enlarged virtual image 12 to reflect the light forming the enlarged virtual image 12 to an observer 11 as represented by the eye in the drawing. By the reflected light the observer 11 can see the enlarged virtual image 12.

Note that in FIG. 1A vertical direction is defined as Y direction while direction orthogonal to the drawing is defined as X direction. Herein, Y direction is also referred to as longitudinal direction and X direction is referred to as transverse direction.

In the micro lens array 8 the micro convex lenses are tightly arranged with a pitch close to a pixel pitch. Each micro convex lens includes a function to diverge the light beam LC, as described in the following.

FIG. 1C shows four light beams L1 to L4 to be incident on the micro lens array 8. It is assumed that the light beams L1 to L4 be incident on the four corners of the image on the micro lens array 8.

Having transmitted through the micro lens array 8, the light beams L1 to L4 are converted to light beams L11 to L14.

If the light with a cross section of a quadrangle shape surrounded by the light beams L1 to L4 is incident on the micro lens array 8, the light is converted to a divergent light surrounded by the light beams L11 to L14. In reality the light beam LC is incident on a specific micro convex lens of the micro lens array 8 at some instant and converted thereby to a divergent beam.

Thus, each micro convex lens diverges the light beam. The divergent beam surrounded by the light beams L1 to L4 is a result of collecting the diverged light beam LC temporally. The light beam LC is diverged for the purpose of irradiating a wide area in the vicinity of the observer 11's eyes with the light beam reflected by the reflective element 10.

Without the optical divergence, the area which the light beam reflected by the reflective element 10 irradiates is limited to only a small area near the observer 11's eyes. If the observer 11 moves his/her head, his/her eyes positions deviate from the small area, the observer 11 cannot view the enlarged virtual image 12.

As described above, the diverged light beam LC can irradiate a wide area near the observer 11's eyes, which allows the observer to surely view the enlarged virtual image 12 irrelevant of a small motion of the head.

Thus, according to the present embodiment the light beam is a parallel beam when incident on the micro lens array 8 and converted to a divergent beam after transmitting through the micro lens array 8.

Next, the micro convex lenses of the micro lens array 8 are described with reference to FIG. 2A, 2B and FIGS. 3A to 3C.

Each micro convex lens is configured to be larger in diameter than the beam diameter of the light beam LC in order to reduce interfering noise.

Figure 2A:
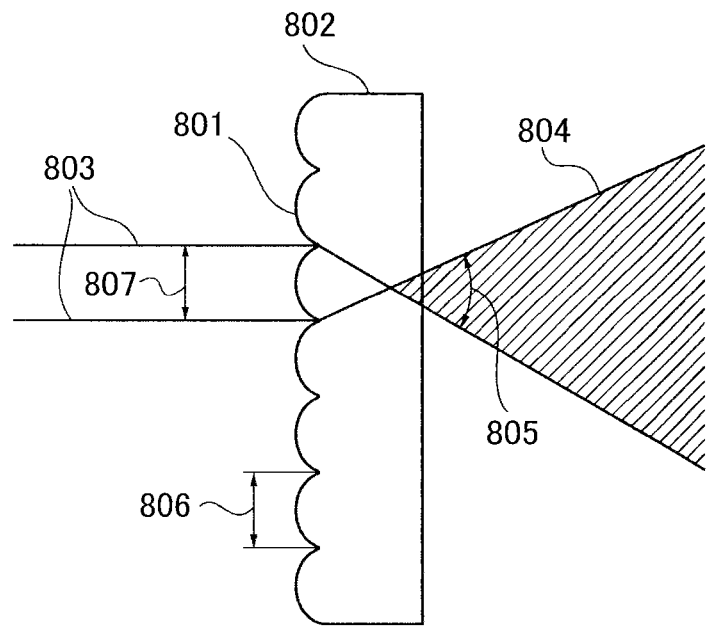
FIGS. 2A, 2B show the divergence of light by a micro convex lens and occurrence of interfering noise.

FIG. 2A shows a micro lens array 802 in which micro convex lenses 801 are densely arranged. The diameter 806 of the micro convex lens 801 is larger than the beam diameter 807 of a light beam 803.

According to the present embodiment the light beam 803 is a laser beam and exhibits an optical intensity distribution around the beam center similar to a Gaussian distribution. Accordingly, the beam diameter 807 is a distance along a beam radius in which optical intensity decreases to $1/e^2$ in the optical intensity distribution. In FIG. 2A the beam diameter 807 appears equal to the diameter of the micro convex lens 801 but it does not need to be equal thereto. It has only not to protrude from the micro convex lens 801.

In FIG. 2A the entire light beam is incident on a single micro convex lens 801 and converted thereby to a divergent beam 804 at a divergent angle 805. In this case interfering noise will not occur since there is only one divergent beam 804 and no interfering beams.

Note that the magnitude of the divergent angle 805 can be arbitrarily set in accordance with the shape of the micro convex lens 801.

Figure 2B:
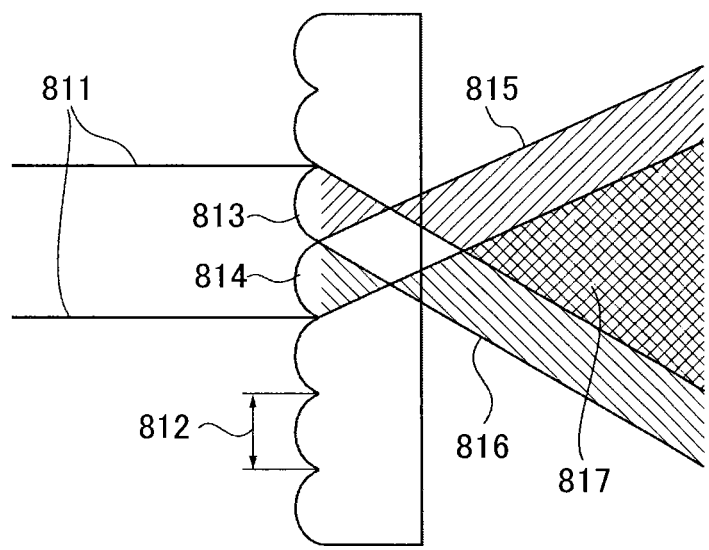

In FIG. 2B the beam diameter of a light beam 811 is double the pitch 812 at which micro convex lenses are arranged. The light beam 811 is incident over two micro convex lenses 813, 814.

In this case the light beam 811 is diverged by the micro convex lenses 813, 814 to two divergent beams 815, 816. The divergent beams 815, 816 then overlap and interfere with each other in an area 817 and interfering noise occurs in this area.

Further, in FIG. 3A a light beam 824 is incident over two micro convex lenses 822, 823 of a micro lens array 821. The beam diameter of the light beam 824 is equal to the diameter of each micro convex lens. In this case one portion of the beam 824 incident on the micro convex lens 822 is converted to a divergent beam 826 while the other portion is converted to a divergent beam 827.

Thus, the divergent beams 826 and 827 are diverged to separate away from each other and do not overlap so that interfering noise will not occur.

As described above, the interfering noise arising from the beams diverged by the micro convex lenses can be prevented when the beam diameter of the light beam 824 is set to be equal to or less than the diameter of the micro convex lens 822.

Next, the numeric examples of the diameter of the micro convex lens and the beam diameter of the light beam are described.

The diameter of the light beam for image display is easily set to about 150 μm, for example. The diameter of each micro convex lens is then set to be larger than 150 μm, for example, 160 μm, 200 μm.

In FIG. 3A the micro convex lenses 822, 823 . . . of the micro lens array 821 are arranged without a gap. The width of a border between two neighboring micro convex lenses should be zero. Only the divergent beams 826, 827 are generated from the incident light beam 824.

However, in actual micro convex lens structure as a micro lens array 831 the width of a border 835 between neighboring micro convex lenses 833, 834 cannot be zero, as shown in FIG. 3B. Microscopically, the edges of the two neighboring micro convex lenses are smoothly continued, forming a curved surface at the border 835. This curved surface acts as a micro lens surface to an incident light beam.

Therefore, a divergent beam 838 in addition to the divergent beams 836, 837 occurs from the light beam 832 incident astride the border 835 of the micro convex lenses 833, 834, and overlaps with the divergent beams 836, 837 in areas 839, 840, causing interfering noise.

FIG. 3C shows how to abate or prevent interfering noise in the micro convex lens structure.

The curved surface of a border 843 gradually connecting the surfaces of micro convex lens 841, 842 acts as a micro lens surface. The curvature radius of the curved surface is set to r.

Herein, the light beam incident on the micro convex lens structure is assumed to be a single color laser beam with a wavelength $\lambda$ for the sake of simplicity. When the curvature radius r of the border 843 is larger than the wavelength $\lambda$ of the laser beam ($r>\lambda$), the curved surface exerts lens effects on an incident laser beam. Then, a beam component passing through the border 843 is diverged and overlaps with the divergent beams from the micro convex lenses 841, 842, causing interfering noise.

Meanwhile, when the curvature radius r of the border 843 is smaller than the wavelength $\lambda$ of the laser beam ($r<\lambda$), the border 843 becomes a sub-wavelength structure to the laser beam. It is well known that a sub-wavelength structure does not exert lens effects on light with a wavelength larger than the sub-wavelength structure. Thus, the border 843 with a curvature radius r smaller than the wavelength $\lambda$ does not function as a lens and has the light beam transmit straight therethrough and not diverged.

Accordingly, a beam portion having transmitted straight through the border 843 does not overlap with the divergent beams from the micro convex lenses 841, 842 and does not cause interfering noise.

Specifically, it is preferable to set a relation of magnitude among the diameter d of the light beam, wavelength $\lambda$, diameter D of the micro convex lens, and curvature radius r of a border surface, as follows:

$$D>d, \lambda>r$$

To display a monochrome enlarged virtual image, the light beam is formed of single-color coherent light with a wavelength $\lambda$. Then, the above parameters d, $\lambda$, D, r are set to satisfy the relation of magnitude above. Thereby, interfering noise can be reduced.

According to the present embodiment the light beam LC is a combined RGB light beam for display of color images. The relation of magnitude among the wavelengths $\lambda R$ (640 nm), $\lambda G$ (510 nm), $\lambda B$ (445 nm) of the three beams is such that $\lambda R>\lambda G>\lambda B$.

In view of preventing the occurrence of interfering noise, the curvature radius r of the border surface should be set to 400 nm smaller than the shortest wavelength $\lambda B$, for example. Moreover, with the curvature radius r smaller than the longest wavelength $\lambda R$, for example, 600 nm, the interfering noise caused by the R components of the light beam can be prevented. The interfering noise can be effectively reduced.

When the curvature radius r is set to, for example, 500 nm so that $r<\lambda G$ the interfering noise caused by the R and G components of the light beam can be prevented. Interfering noise occurs from three RGB components of the light beam LC independently and the independent interfering noise from the RGB components is collectively recognized visibly by the observer. Therefore, such visible interfering noise can be greatly reduced by eliminating interfering noise caused by one color, the R components with the longest wavelength only, contributing to improving the quality of an image to be observed. Noise reduction effects are further improved by eliminating the interfering noise caused by the G components and B components in this order. Thus, setting the curvature radius to 600 nm, for example, smaller than the longest wavelength $\lambda R$ makes it possible to achieve a decrease in interfering noise in a certain level.

In general the relation, $R\approx G>B$ holds true in terms of the visibility of interfering noise although the intensity of the interfering noise varies depending on wavelength, beam diameter, and multiple/single mode. That is, the visibility of the human eyes is low to light with a wavelength $\lambda B$, therefore, interfering noise is not conspicuous. With the curvature radius r set to, for example, 500 nm, smaller than the wavelength $\lambda G$, highly visible interfering noise caused by light with the wavelengths $\lambda R$, $\lambda G$ can be reduced. With the curvature radius r set to, for example, 400 nm smaller than the wavelength $\lambda B$, the interfering noise can be more effectively reduced, as described above.

The size of each micro convex lens is in the order of 100 μm, and it is a general micro lens. The micro convex lens structure is a general micro lens array.

To manufacture the micro lens array, generally, a mold having the transfer surface of a micro lens array surface is prepared, and then the mold surface is transferred onto a resin material. It is known that the transfer surface of the mold is formed by cutting or photolithography.

Alternatively, the transfer surface can be transferred to a resin material by injection molding, for example.

To reduce the curvature radius of the border of neighboring micro lenses, the width of the border has to be reduced. The reduction of the border width can be realized by sharpening the border.

There are various known techniques for manufacturing the micro lens array mold by which the border width between neighboring micro lenses is decreased to the order of wavelength.

For instance, Japanese Patent No. 4200223 discloses a technique to increase the curvature radius of each micro lens by anisotropic etching or ion process and remove a non-lens portion of a border portion.

Moreover, Japanese Patent No. 5010445 discloses a technique to remove a flat surface between neighboring micro lenses by isotropic dry etching.

By these known techniques a micro lens array having border surfaces with a sufficiently small curvature radius can be manufactured. By the micro lens array with border surfaces having curvature radius less than 640 nm, interfering noise due to R components can be prevented from occurring. Similarly, by the micro lens array with border surfaces having curvature radius less than 510 nm, interfering noise due to RG components can be prevented from occurring. By the micro lens array with border surfaces having curvature radius less than 445 nm, interfering noise due to RGB components can be prevented from occurring.

The concave mirror 7 in FIG. 1 is configured to reflect the light beam LC two-dimensionally deflected to travel in a certain direction. The concave mirror 7 functions as a deflection restrictor to adjust a deflection area of the light beam and limit the scan area of the micro lens array.

7Such a deflection restrictor is omissible if the deflection angle of the light beam two-dimensionally deflected by the optical deflector is not large.

Next, examples of the arrangement of micro lenses in the micro lens array are described.

The condition for the micro lens array and micro lenses is such that micro convex lenses with a diameter larger than a beam diameter of the light beam are arranged tightly with a pitch close to a pixel pitch. Upon satisfaction of the condition, the arrangement of micro lenses can be arbitrarily decided.

Figure 4A:
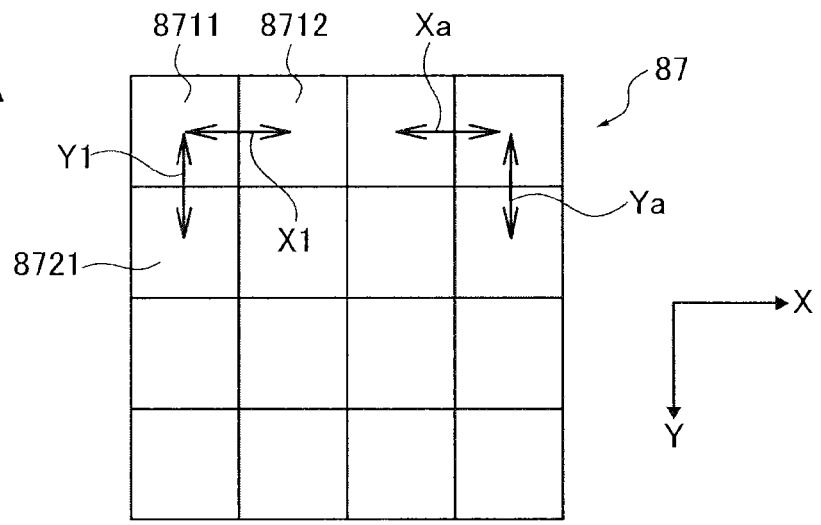
FIGS. 4A to 4C show three examples of how micro convex lenses are arranged.
Figure 4B:
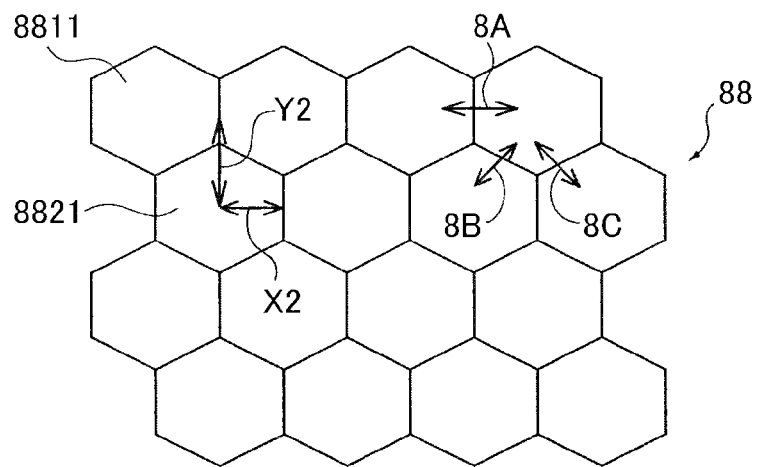
Figure 4C:
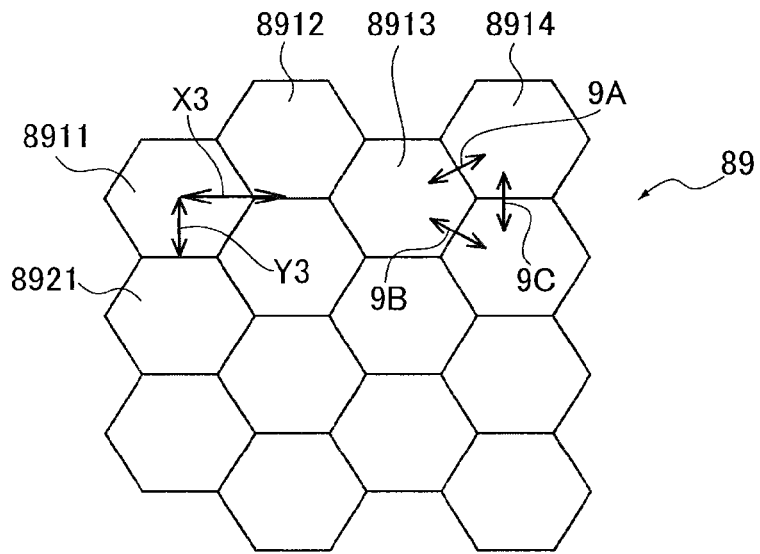

FIGS. 4A to 4C show three examples of the arrangement of micro lenses. In FIG. 4A in a micro lens array 87 square-shape micro lenses 8711, 8712, . . . are arranged in square matrix.

The number of pixels of an image or an enlarged virtual image displayed with the headup display device is determined by the pitch of the micro lenses arranged in the micro lens array.

In FIG. 4A a distance between the centers of the adjacent micro lenses in X direction is set to X1 while that in Y direction is set to Y1. X1 and Y1 are the pixel size of one pixel, that is, effective pixel pitch.

In FIG. 4B in a micro lens array 88 regular hexagonal micro lenses 8811, 8821 . . . are densely arranged. In this arrangement each micro lens does not include a side parallel to X direction. The top and bottom sides of each micro lens are in a zigzag form so that this arrangement is called zigzag arrangement.

In FIG. 4C in a micro lens array 89 regular hexagonal micro lenses 8911, 8921 . . . are densely arranged. In this arrangement each micro lens has sides parallel to X direction. This arrangement is called armchair arrangement and the zigzag arrangement and armchair arrangement are collectively called honeycomb arrangement.

The armchair arrangement in FIG. 4C is formed by rotating the zigzag arrangement in FIG. 4B by 90 degrees. In the zigzag arrangement effective pixel pitches in X and Y directions are X2 and Y2, respectively.

In the armchair arrangement effective pixel pitches in X and Y directions are X3 and Y3, respectively.

In FIG. 4B the effective pixel pitch Y2 is a distance between the center of the micro lens 8821 and the midpoint of the right side of the micro lens 8811.

In FIG. 4C the effective pixel pitch X3 is a distance between the center of the micro lens 8911 and the midpoint of a common side of two micro lenses contacting the right sides of the micro lens 8911.

In the zigzag arrangement the effective pixel pitch X2 is small so that a resolution of an image display can be improved in X direction. Similarly, in the armchair arrangement an image resolution can be improved in Y direction.

By the micro lens array in the honeycomb arrangement, it is possible to effectively represent a pixel of size smaller than an actual lens diameter and increase the effective pixel number.

Further, as described above, the borders of neighboring micro lenses can be, for example, formed to have the curvature radius r smaller than the wavelength $\lambda R$ of the R components of the light beam LC in order to prevent interfering noise due to R components of coherent light.

However, if the curvature radius is larger than the wavelengths $\lambda G$, $\lambda B$ of the G and B components, these lights will be diverged by the border portions and interfere with each other, causing interfering noise.

In such a case, in the square matrix arrangement in FIG. 4A the light beam is diverged at the borders in both Ya and Xa directions, causing interfering noise.

Meanwhile, in the honeycomb arrangement in FIGS. 4B and 4C the light beam is diverged at the borders in three directions 8A, 8B, 8C and 9A, 9B, 9C, respectively.

Thus, in the square matrix arrangement interfering noise occurs bi-directionally while in the honeycomb arrangement it occurs tri-directionally.

Since the maximal intensity of coherent light causing interfering noise is constant, the larger the number of diverged lights, the weaker the contrast of interfering noise and the less visible or conspicuous it becomes.

Accordingly, the micro lenses are preferably arranged in the honeycomb form when the interfering noise by light components with a wavelength smaller than the curvature radius r is allowed.

If the border width between the neighboring lenses is larger than the wavelength $\lambda R$, interfering noise caused by coherent light of R components will occur. However, since the border width is minute, the optical power of coherent light incident on the border width is small. So is the optical power causing the interfering noise.

Accordingly, even with the occurrence of interfering noise, the honeycomb micro lens array can diverge the light beam in three directions, weakening the contrast of interfering noise. This contributes to effectively reducing visible interfering noise.

As described above, referring to FIG. 1A, the virtual image optical system is comprised of the concave mirror 9 to form the enlarged virtual image 12. That is, the enlarged virtual image 12 is an aggregate of pixel images formed by the concave mirror 9.

By forming each micro lens as anamorphic lens, the micro lens can diverge the light beam in two mutually perpendicular directions.

Figure 6:
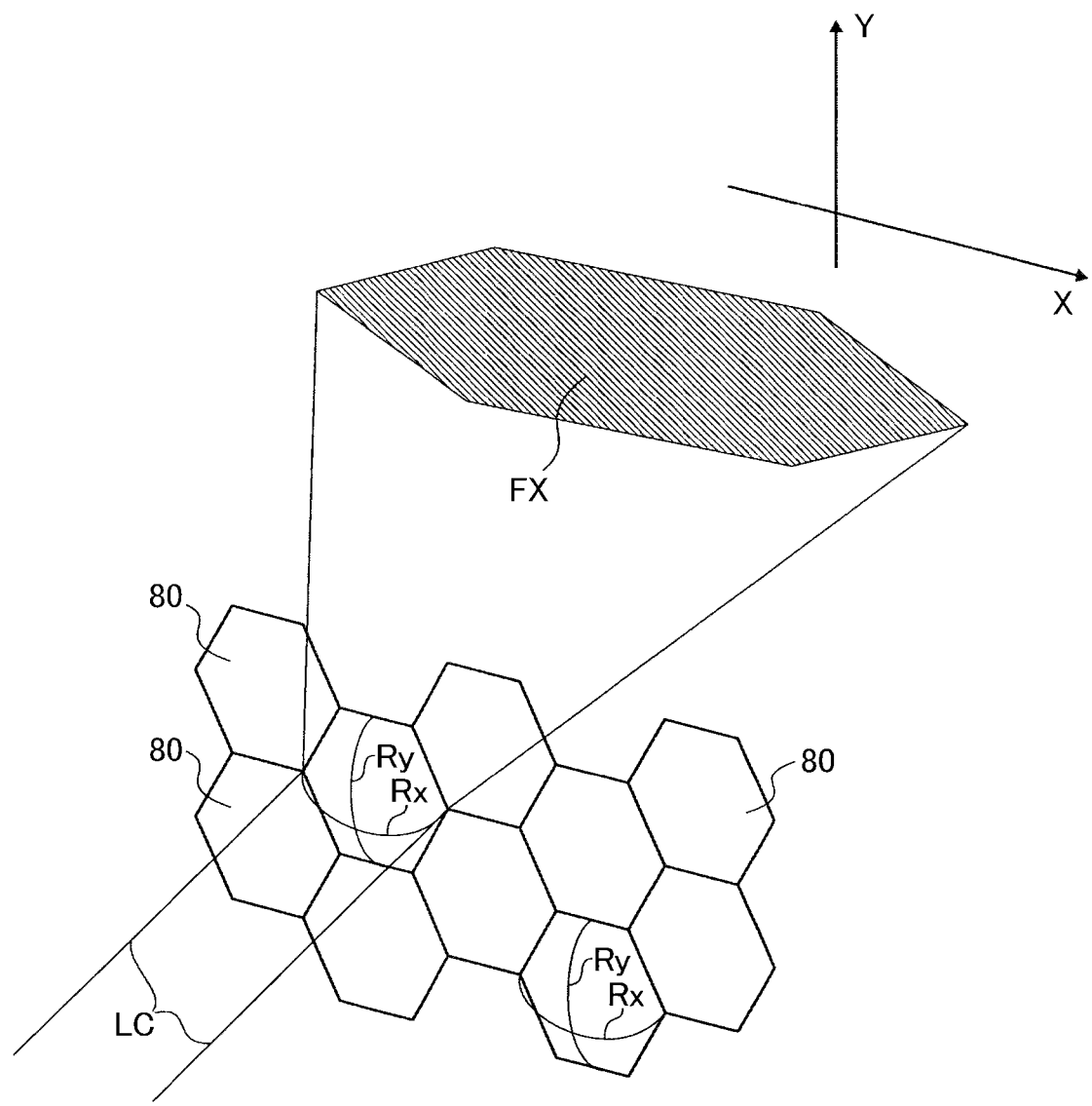
FIG. 6 shows an anamorphic micro convex lens.

Referring to FIG. 6, in the micro lens array 8 micro convex lenses 80 are densely arranged in armchair form in which parallel sides are aligned in X direction, by way of example. The curvature radius of a lens surface of each micro convex lens differs between in X direction and in Y direction. The curvature radius Rx in X direction is smaller than that Ry in Y direction.

Accordingly, the optical power of the micro convex lens 80 is larger in X direction than in Y direction. Further, because of the lens surface having curvature both in X and Y directions, the shape of each lens can be formed in hexagon to thereby abate visible interfering noise. FIG. 6 shows an example where the light beam LC is incident on a single micro convex lens 80. The width of each lens is longer in Y direction than in X direction.

The shape of the light beam LC is elliptic, long in Y direction and the beam diameter thereof in Y direction is set to be smaller than the diameter of the micro convex lens 80 in Y direction. This makes it possible to allow the light beam LC to be incident on the micro lens array without crossing the lens border. As a result, the cross sectional form of a divergent beam will be elliptic, long in X direction.

Irrespective of the lengths of each micro convex lens in X and Y directions, the cross section FX of the light beam LC emitted from each lens is longer in Y direction than in X direction, as long as the curvature thereof is larger in X direction than in Y direction.

The headup display device can be mounted in an automobile, for example, to allow a driver to view the enlarged virtual image while driving. Moreover, it can be placed so that a longer dimension of a cross sectional form of a light beam diverged by the micro lenses of the micro lens array becomes parallel to a horizon. In automobile, X direction is a transverse direction and Y direction is a longitudinal direction when seen from a driver's seat. The windshield of an automobile functions as the reflective element 10.

The enlarged virtual image 12 can be displayed as a navigation image in front of the windshield, for example. A driver or the observer 11 can view the image from the driver's seat.

In general the enlarged virtual image is preferably a transversely long image as seen from the driver, that is, an image formed on the micro lens array has a larger angle of view in X direction.

Further, the field of view of the enlarged virtual image is required to be transversely larger than longitudinally so that the driver can see the display diagonally from right and left sides. Accordingly, the micro lenses are required to exhibit a larger divergent angle (non-isotropic diffusion) in longitudinal or X direction than in transverse or Y direction of the enlarged virtual image.

Thus, it is preferable that the micro convex lenses of the micro lens array are anamorphic, having a larger curvature in longitudinal direction than in transverse direction of the enlarged virtual image, to diverge the light beam at wider angles in transverse direction than in longitudinal direction.

Thereby, the micro lens array can diverge the light beam in a required minimal angle range satisfying the necessary angle of view of the headup display device, contributing to improving optical use efficiency and brightness of a displayed image.

Alternatively, the micro lens array can be configured to exhibit isotropic diffusion at the same divergent angle longitudinally and transversely, instead of non-isotropic diffusion. However, concerning the headup display device for use in an automobile or the like, a driver is unlikely to view a displayed image from a vertical position. Therefore, it is preferable that the divergent angle of the micro lens array is set to be larger in transverse direction than in longitudinal direction of the image in terms of optical use efficiency.

Moreover, it is known that the surfaces of the micro convex lenses can be formed as aspheric. The anamorphic lens surface according to the present embodiment is also aspheric, and it can be formed as a more general type aspheric surface to correct aberration. By aberration correction, unevenness in the intensity of optical divergence can be reduced.

In FIGS. 4A to 4C the square or regular hexagonal-shape micro convex lenses are shown by way of example. The shape of the micro convex lenses should not be limited to such examples. It can be shaped such that the shapes shown in FIGS. 4A to 4C are extended in one direction. That is, the square is turned into a rectangle and the regular hexagon is turned into a deformed long hexagon.

In FIGS. 4A to 4C the effective pixel pitches of the micro lens array in X and Y directions are X1 to X3 and Y1 to Y3, respectively. The ratio between the effective pixel pitches in X and Y directions SX, SY is called aspect ratio SY/SX.

In FIG. 4A since X1=Y1, the aspect ratio Y1/X1 is 1.0

In FIG. 4B since Y2>X2, the aspect ratio Y2/X2 is larger than 1.0

In FIG. 4C since Y3<X3, the aspect ratio Y3/X3 is smaller than 1.0

FIGS. 5A to 5E show other examples of the arrangement of micro convex lenses. The effective pixel pitches in X and Y directions are X11, Y11, X12, Y12, and X13, Y13.

Figure 5A:
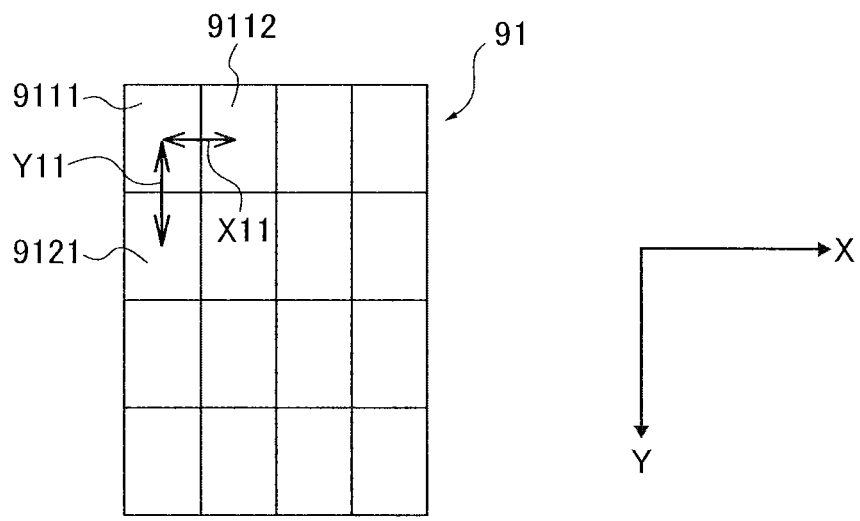
FIGS. 5A to 5E show five other examples of how micro convex lenses are arranged.

In FIG. 5A in a micro lens array 91 rectangular micro convex lenses 9111, 9112 . . . , 9121 . . . are arranged in square matrix and the aspect ratio is larger than 1.0.

In FIG. 5B to 5E in micro lens arrays 92 to 95 micro convex lenses are arranged in honeycomb form and the aspect ratios thereof Y12/X12, Y13/X13 are both larger than 1.0.

The five examples of micro lens array are all larger in length in Y direction than in X direction. This type of micro convex lenses can be easily formed to have a larger curvature in X direction than in Y direction. Accordingly, they can easily realize anamorphic effects to exert larger optical power in X direction than in Y direction.

For example, in FIG. 5A the effective pixel pitches are set to X11=150 μm and Y11=200 μm, and the aspect ratio will be 200/150=4/3>1. Also, the beam diameter of the light beam needs to be smaller than 150 μm in X direction and 200 μm in Y direction.

Figure 5B:
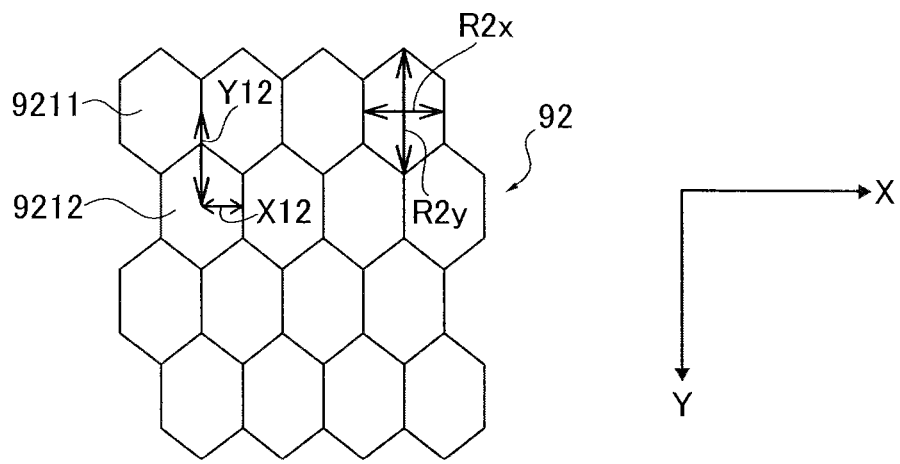
Figure 5C:
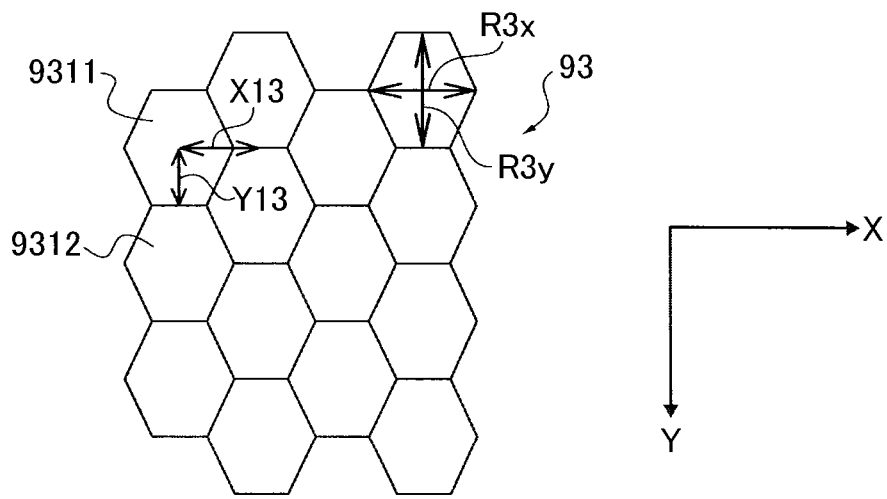
Figure 5D:
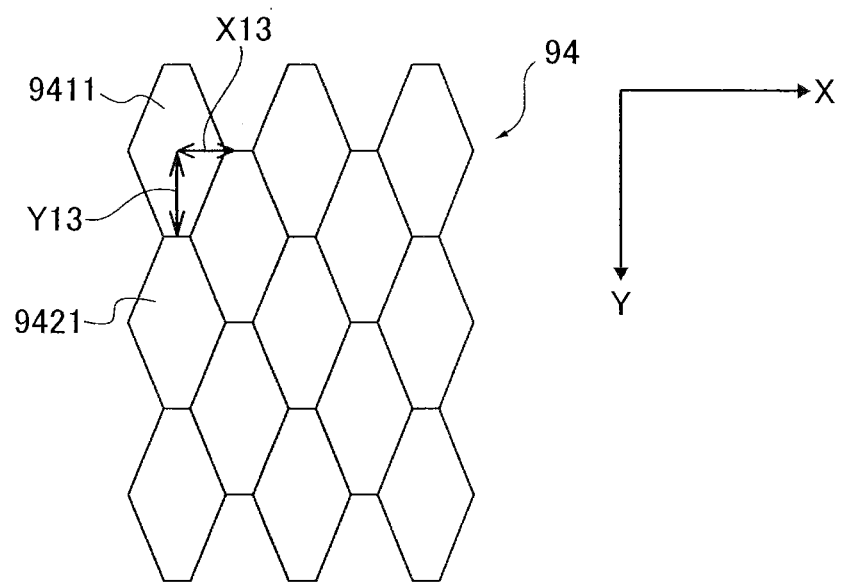
Figure 5E:
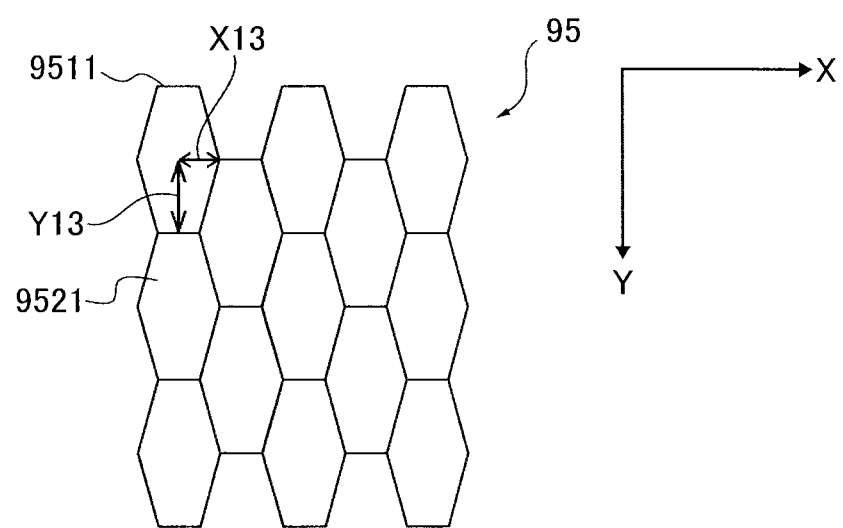

In the micro lens arrays in honeycomb form in FIGS. 5B to 5E the shape of each micro convex lens is long in Y direction. Specifically, the micro lens array in FIG. 5B is of the zigzag type and those in FIGS. 5C to 5E are of the armchair type.

The zigzag type honeycomb arrangement in FIG. 5B and armchair type honeycomb arrangement are both useful. However, the arrangement in FIG. 5C is more advantageous than that in FIG. 5B because a difference in the longitudinal and transverse lengths of the micro convex lens and a difference between the longitudinal and transverse effective pixel pitches are both smaller.

Specifically, in FIG. 5B assumed that the diameter R2x of each micro convex lens in X direction is 100 μm and that R2y in Y direction is 200 μm. Then, the effective pixel pitch X12 in X direction is 50 μm and that Y12 in Y direction is 150 μm.

Similarly, in FIG. 5C assumed that the lens diameter R3x of each micro convex lens in X direction is 100 μm and that R3y in Y direction is 200 μm. Then, the effective pixel pitch X13 in X direction is 75 μm and that Y13 in Y direction is 100 μm.

Thus, the differences in the effective pixel pitches in X and Y directions are smaller in FIG. 5C (50 μm and 75 μm) than in FIG. 5B (50 μm and 100 μm).

In the honeycomb type arrangements in FIGS. 5C to 5E the transverse and longitudinal effective pixel pitches are all defined as X13 and Y13. In FIGS. 5D, 5E the top and bottom sides of each micro convex lens parallel to X direction are longer than oblique sides.

By changing the hexagonal shape of each micro convex lens as shown in FIGS. 5D, 5E, the effective pixel pitches X13 and Y13 can be adjusted. Owing to the vertically long structure, they can be equalized, as in FIG. 5C.

Figure 8:
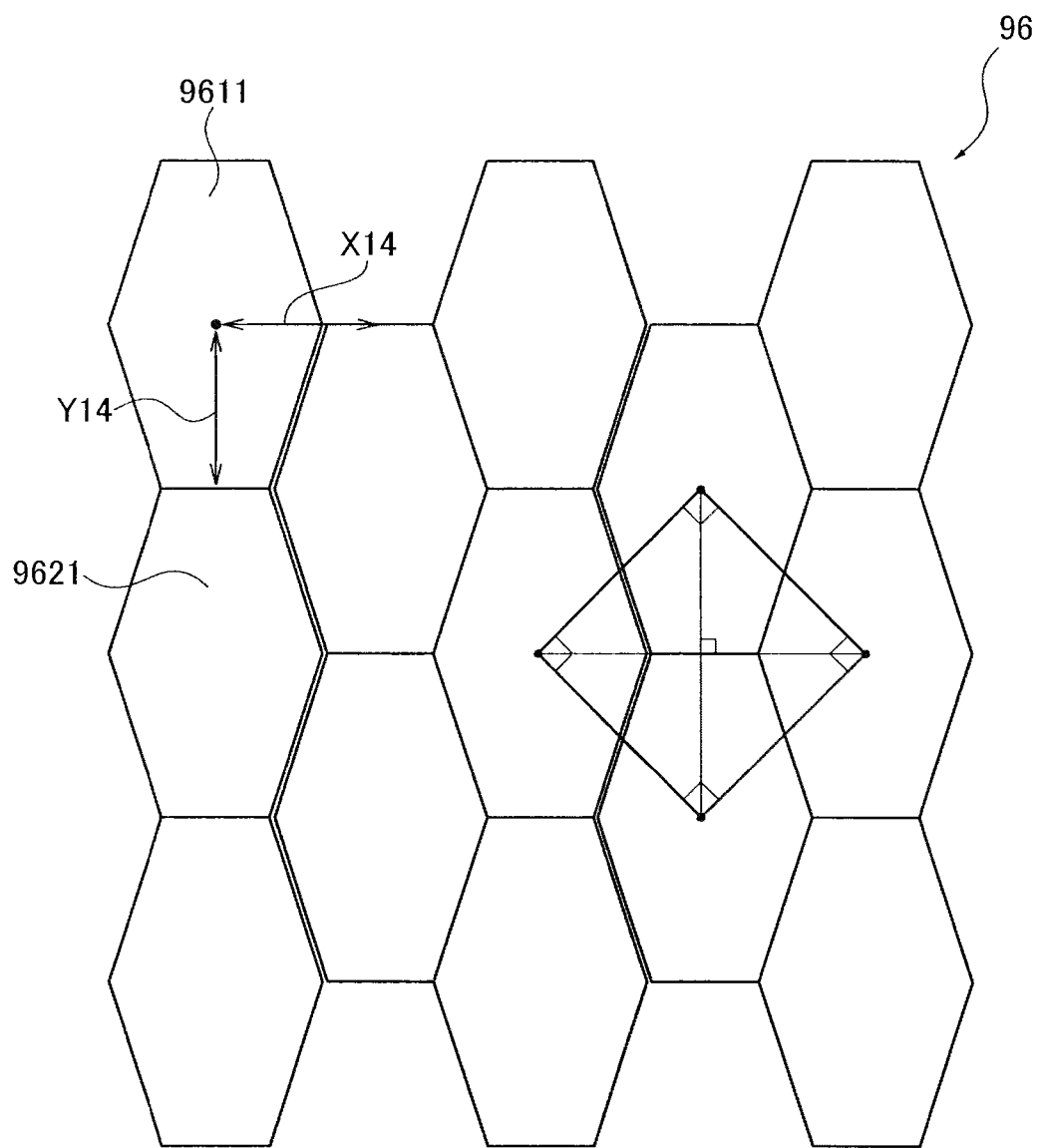
FIG. 8 shows still another example of how micro convex lenses are arranged.

For example, FIG. 8 shows a micro lens array 96 in which micro lenses 9611, 9621 . . . are arranged. The micro lenses are shaped in oblong hexagon as those in FIG. 5D and arranged in armchair type oblong honeycomb form as in FIG. 5C. The hexagonal shape of each micro lens is formed so that the effective pixel pitch X14 in X direction completely matches that Y14 in Y direction. Thus, aspect ratio can be set to 1.0.

At the aspect ratio of 1.0, micro convex lenses having a diameter larger than or equivalent to that of the light beam LC can enhance reproducibility of an enlarged vertical image relative to image data to be projected. This is because the pixel pitch of the image data on the micro lens array can be made coincident with the effective pixel pitch or the effective pixel pitch can be closer to the pixel pitch of the image data.

In the above the longitudinal and transverse directions are defined to be vertical and horizontal directions, respectively, for the sake of simple explanation. In actual space a longitudinal direction is determined depending on the direction in which the micro lens array is mounted in the image display device or the image display device is mounted in a vehicle. The optical deflector 6 is configured to reciprocatively oscillate around one axis as first axis at plural times while reciprocatively oscillating around the other axis as second axis at once. In many circumstances the X direction as longitudinal direction of an enlarged virtual image is set to a direction in which the micro lens array is scanned with the light beam LC.

The top and bottom sides of the hexagonal micro lenses in the armchair arrangement are approximately parallel to the scanning direction relative to the micro lens array. The armchair type oblong honeycomb structure is formed by extending the interval between a pair of opposing sides of each micro lens most parallel to the scanning direction in an orthogonal direction relative to these sides.

By the armchair type oblong honeycomb structure, it is able to improve the brightness of an image and effective pixel number as well as to decrease the difference in effective pixel pitches between in X (transverse) direction and in Y (longitudinal) direction. Further, the shapes of the micro convex lenses in FIGS. 5C to 5E can be arbitrarily determined for the purpose of controlling the divergent angle of divergent beam, for example.

In the headup display device in FIG. 1A the light beam LC is incident on the micro lens array 8 orthogonally. However, the light beam LC is not always orthogonally incident thereon.

Figure 7A:
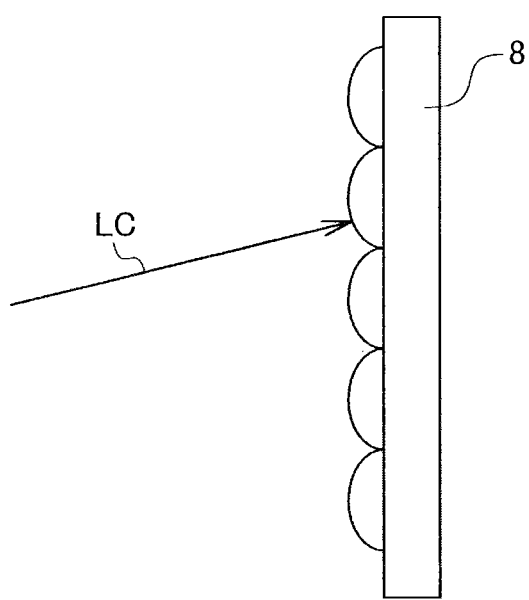
FIGS. 7A, 7B show two examples of a micro lens array.
Figure 7B:
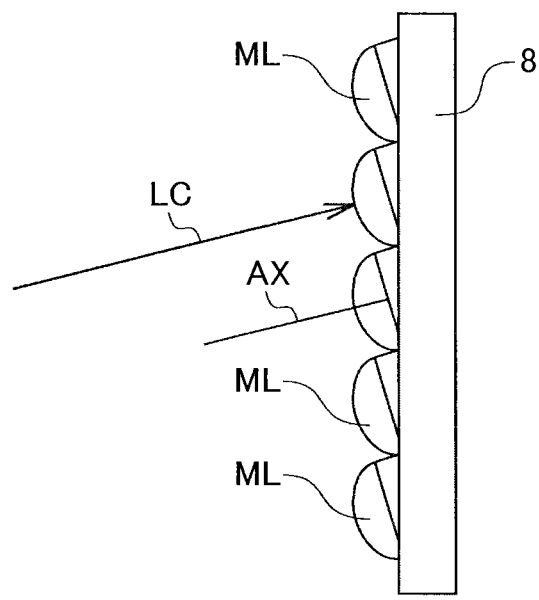

For example, in order to downsize the headup display device by changing the arrangement of the optical elements from the light source to the reflective element, the light beam LC can be incident on the micro lens array 8, as shown in FIGS. 7A, 7B.

In FIG. 7A the incidence angle of the light beam LC is inclined relative to the micro lens array 8.

With use of the micro convex lens having an aspheric surface, the light beam LC is incident obliquely relative to the optical axis of the aspheric surface. Therefore, the effects of the aspheric surface may not be exerted.

In such a case, preferably, in a micro lens array 8a micro convex lenses ML are placed so that their optical axes AX are inclined relative to a direction orthogonal to the reference surface of the micro lens array 8a, as shown in FIG. 7B. Thereby, the optical axes AX are parallel or approximately parallel to the incidence direction of the light beam LC. Note that the reference surface is a surface on which the micro convex lenses are arranged.

Thus, it is made possible to downsize the optical system, improve optical use efficiency and stably diverge the light beam LC in a constant direction.

The headup display device according to the present embodiment can be incorporated in various kinds of operable vehicles such as train, ship and vessel, helicopter, airplane in addition to the automobile described above. In such a case a glass element ahead of an operator's seat can be a reflective element.

Further, the headup display device according to the present embodiment can be implemented as a two-dimensional image display device for movies, for instance.

Further, the micro convex lenses can be configured to diverge the light beam in one direction only instead of two directions X, Y. In such a case the lens surfaces thereof can be formed as a micro convex cylinder surface.

Note that the hexagonal micro convex lenses and honeycomb arrangement thereof are known in connection with micro lens array fabrication method.

According to the present embodiment, the image display device can improve optical use efficiency and the brightness of a displayed image. In addition, by use of the micro lens array having curvature in both X and Y directions on the lens surface, it can abate visible interfering noise.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image display device comprising:
a lens array; and
a scanner to two-dimensionally scan the lens array with a light beam for image display, wherein
each of lenses of the lens array includes a convex surface with different curvatures in two directions orthogonal to an optical axis of the lens and to each other,
in the lens array a shape of the lenses are a hexagon and the lenses are densely arranged,
the shape of the hexagon is formed by extending an interval between a pair of opposing sides in a direction orthogonal to the opposing sides,
the opposing sides among sides of the hexagon are most parallel to a direction in which the lens array is two-dimensionally scanned with the light beam, and
X/Y=1,
where X is a distance from a center of a lens to a midpoint of a border line between two neighboring lenses, and Y is a distance from the center of the lens to a top side or bottom side of the lens.

2. The image display device according to claim 1, wherein:
the light beam forms an image with a long side and a short side; and
the convex surface of each lens is formed to be larger in curvature on the long side than on the short side.

3. The image display device according to claim 1, wherein a diameter of each lens of the lens array is larger than a beam diameter of the light beam.

4. A vehicle comprising:
an image display device including
a lens array, and
a scanner to two-dimensionally scan the lens array with a light beam for image display, wherein
each of lenses of the lens array includes a convex surface with different curvatures in two directions orthogonal to an optical axis of the lens and to each other,
in the lens array a shape of the lenses are a hexagon and the lenses are densely arranged,
the shape of the hexagon is formed by extending an interval between a pair of opposing sides in a direction orthogonal to the opposing sides,
the opposing sides among sides of the hexagon are most parallel to a direction in which the lens array is two-dimensionally scanned with the light beam,
X/Y=1,
where X is a distance from a center of a lens to a midpoint of a border line between two neighboring lenses, and Y is a distance from the center of the lens to a top side or bottom side of the lens, and the image display device is placed so as to allow a user to see an enlarged virtual image of a two-dimensional image while driving.

5. The vehicle according to claim 4, wherein the image display device is placed so that a longer dimension of a cross sectional form of a light beam diverged by the lenses of the lens array becomes parallel to a horizon.

* * * * *